(12) United States Patent
Li et al.

(10) Patent No.: US 9,188,829 B2
(45) Date of Patent: Nov. 17, 2015

(54) ELECTROPHORETIC DISPLAY FILM FOR ANTI-COUNTERFEIT APPLICATION

(71) Applicant: SiPix Imaging, Inc., Fremont, CA (US)

(72) Inventors: Yu Li, Fremont, CA (US); HongMei Zang, Fremont, CA (US)

(73) Assignee: E Ink California, LLC, Fremont, CA (US)

( * ) Notice: Subject to any disclaimer, the term of this patent is extended or adjusted under 35 U.S.C. 154(b) by 162 days.

(21) Appl. No.: 14/021,847

(22) Filed: Sep. 9, 2013

(65) Prior Publication Data

US 2015/0070751 A1   Mar. 12, 2015

(51) Int. Cl.
| | |
|---|---|
| *G02B 26/00* | (2006.01) |
| *G02B 26/08* | (2006.01) |
| *G02F 1/29* | (2006.01) |
| *G09G 3/34* | (2006.01) |
| *G02F 1/167* | (2006.01) |
| *B42D 25/30* | (2014.01) |
| *B42D 25/00* | (2014.01) |

(52) U.S. Cl.
CPC .............. *G02F 1/167* (2013.01); *B42D 25/00* (2014.10); *B42D 25/30* (2014.10); *G02F 2001/1672* (2013.01); *G02F 2201/50* (2013.01)

(58) Field of Classification Search
USPC ......... 359/237, 242, 245–247, 253, 265–273, 359/282, 290–292, 295, 296, 298, 315, 316, 359/321–323
See application file for complete search history.

(56) References Cited

U.S. PATENT DOCUMENTS

| | | | |
|---|---|---|---|
| 6,831,770 B2 | 12/2004 | Liang et al. | |
| 6,930,818 B1 | 8/2005 | Liang et al. | |
| 7,675,672 B2 | 3/2010 | Cernasov | |
| 7,821,702 B2 | 10/2010 | Liang et al. | |
| 7,880,958 B2 | 2/2011 | Zang et al. | |
| 8,520,292 B2 | 8/2013 | Liang et al. | |
| 2003/0107797 A1* | 6/2003 | Saxe | 359/296 |
| 2006/0132579 A1* | 6/2006 | Daniel et al. | 347/171 |
| 2008/0020007 A1 | 1/2008 | Zang | |

FOREIGN PATENT DOCUMENTS

| | | |
|---|---|---|
| KR | 10-2012-0067111 | 6/2012 |
| WO | WO 01/67170 | 9/2001 |

OTHER PUBLICATIONS

PCT/US2014/053716, Notification of Transmittal of the International Search Report and the Written Opinion of the International Searching Authority, or the Declaration, mailed Dec. 16, 2014.
U.S. Appl. No. 13/686,778, filed Nov. 27, 2012, Li et al.
(Continued)

*Primary Examiner* — Stephone B Allen
*Assistant Examiner* — Brandi Thomas
(74) *Attorney, Agent, or Firm* — Perkins Coie LLP

(57) ABSTRACT

The present invention is directed to an electrophoretic display film which can be controlled to malfunction permanently within a period of time. It provides an elegant method to utilize an electrophoretic film for anti-counterfeit purposes. The concept involves the removal of strong barrier layer(s) from the film to allow the solvent in the electrophoretic fluid within the film to evaporate through weak barrier layer(s), and within a period of time, the performance of the display film will be significantly degraded and the film cannot be re-used.

7 Claims, 1 Drawing Sheet

(56) References Cited

OTHER PUBLICATIONS

Zang, H.M., Wang, F., Kang, Y.M., Chen, Y. and Lin, W. (Jul. 2007) *Microcup® e-Paper for Embedded and Flexible Designs*. IDMC'07, Taipei International Convention Center, Taiwan.

Zang, H.M. (Feb. 2007) *Developments in Microcup® Flexible Displays*. Presentation conducted at the 6th Annual Flexible Display and Microelectronics Conference, Phoenix, AZ Feb. 6-8.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Zang, H.M. (Sep. 2006) *Monochrome and Area Color Microcup®EPDs by Roll-to-Roll Manufacturing Process*. Presentation conducted at the Fourth Organic Electronics Conference and Exhibition (OEC-06), Sep. 25-27, 2006, Frankfurt, Germany.

Wang, X., Zang, H.M. and Li, P. (Jun. 2006) Roll-to-Roll Manufacturing Process for Full Color Electrophoretic film. *SID Digest*, 00pp. 1587-1589.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.

Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.

Liang, R.C., (Feb. 2005) *Flexible and Roll-able Displays/Electronic Paper—A Brief Technology Overview*. Flexible Display Forum, 2005, Taiwan.

Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Ho, Candice. (Feb. 1, 2005) *Microcupt® Electronic Paper Device and Application*. Presentation conducted at USDC 4th Annual Flexible Display Conference 2005.

Bardsley, J.N. & Pinnel, M.R. (Nov. 2004) Microcup™ Electrophoretic Displays. *USDC Flexible Display Report*, 3.1.2. pp. 3-12-3-16.

Liang, R.C. (Oct. 2004) *Flexible and Roll-able Displays/Electronic Paper—A Technology Overview*. Paper presented at the METS 2004 Conference in Taipie, Taiwan.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology Expo & Conference.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814,I9.6.1.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Zang, H.M. (Feb. 2004). *Microcup Electronic Paper*. Presentation conducted at the Displays & Microelectronics Conference of U.S. Display Consortium, Phoenix, Arizona, USA.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging*, SPIE vol. 5289, 102-108.

Ho, C., & Liang, R.C. (Dec. 2003). *Microcup ® Electronic Paper by Roll-to-Roll Manufacturing Processes*. Presentation conducted at FEG, Nei-Li, Taiwan.

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Zang, H.M. (Oct. 2003). *Microcup ® Electronic Paper by Roll-to-Roll Manufacturing Processes*. Presentation conducted at the Advisory Board Meeting, Bowling Green State University, Ohio, USA.

Allen, K. (Oct. 2003). Electrophoretics Fulfilled. *Emerging Displays Review: Emerging Display Technologies*, Monthly Report—Oct. 2003, 9-14.

Kleper, M., Miller, P., Miller L. (Oct. 2003) An Investigation of the Emerging and Developing Technologies Related to the Generation Beyond Print-on-Paper, *Advanced Display Technologies*, Oct. 2003, pp. 13-15, Rochester Institute of Technology (R.I.T.).

Zang, H.M., & Liang, R.C. (2003) Microcup Electronic Paper by Roll-to-Roll Manufacturing Processes. *The Spectrum*, 16(2), 16-21.

Chen, S.M. (Jul. 2003) The Applications for the Revolutionary Electronic Paper Technology. *OPTO News & Letters*, 102, 37-41. (in Chinese, English abstract attached).

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Chen, S.M. (May 2003) The New Application and the Dynamics of Companies. *TRI.* 1-10. (in Chinese, English abstract attached).

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), pp. 621-628.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C., Hou, J., & Zang, H.M. (Dec. 2002) Microcup Electrophoretic Displays by Roll-to-Roll Manufacturing Processes. *IDW*, EP2-2, 1337-1340.

Nikkei Microdevices. (Dec. 2002) Newly-Developed Color Electronic Paper Promises—Unbeatable Production Efficiency. *Nikkei Microdevices*, p. 3. (in Japanese, with English translation).

Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int'l Conference on Digital Printing Technologies, Digital Fabrication 2009 (NIP 25) by Society for Imaging Science and Technology, in Louisville, Kentucky, USA.).

\* cited by examiner

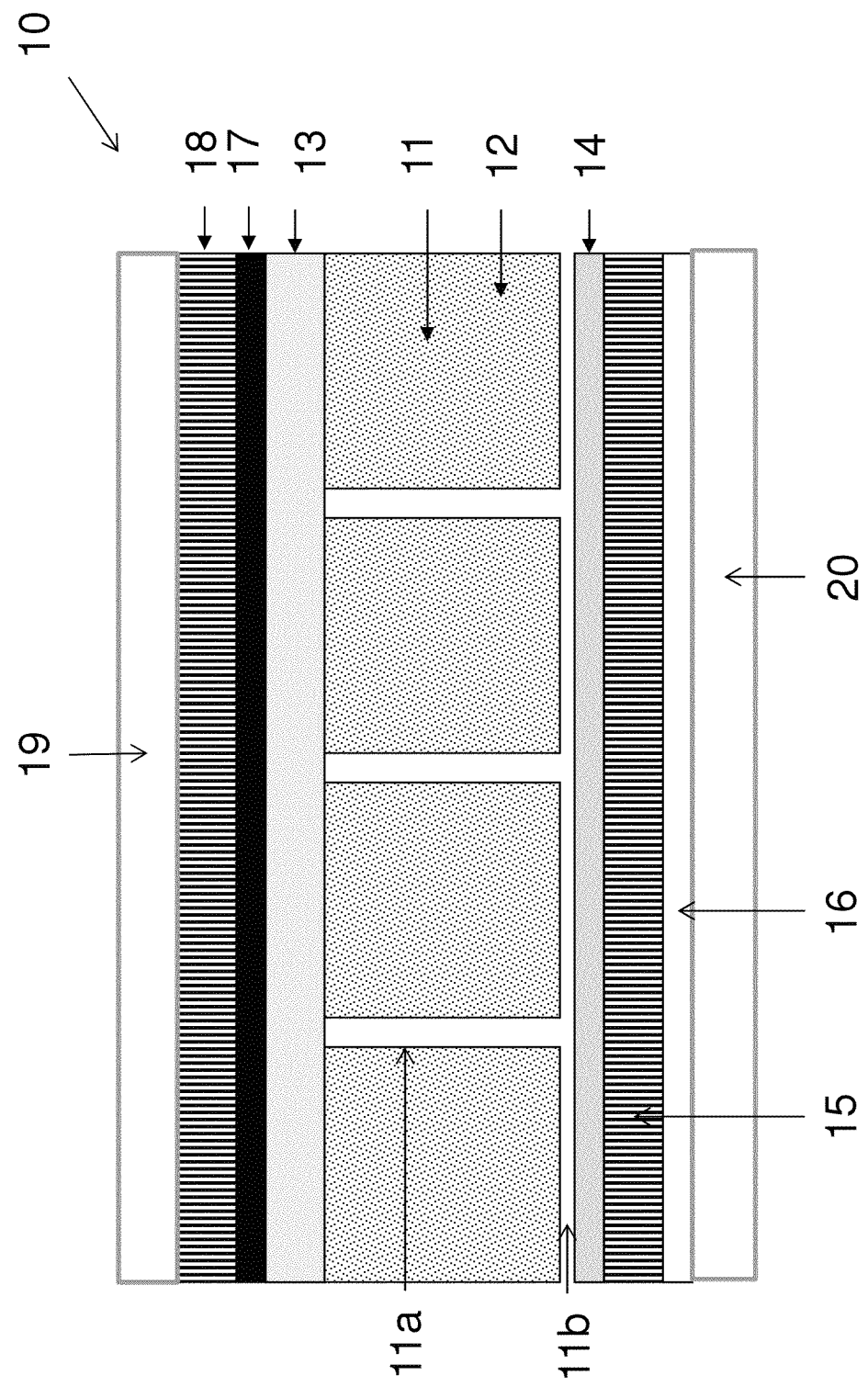

ELECTROPHORETIC DISPLAY FILM FOR ANTI-COUNTERFEIT APPLICATION

TECHNICAL FIELD

The present application relates to an electrophoretic display film in a module, which can be used in an anti-counterfeit application.

BACKGROUND

An electrophoretic display (EPD) is a non-emissive device based on the electrophoresis phenomenon influencing charged pigment particles dispersed in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates. An electrophoretic fluid may have one type, two types or multiple types of pigment particles dispersed in a solvent or solvent mixture.

A tamper-free anti-counterfeit module associated with a product preferably is for one-time use only. Therefore when an electrophoretic display film is incorporated into such a module, the preference is that the film will cease to be operable after the package for the product is opened. One of the approaches is to physically damage the film in the module. However, this approach will result in leaking of the electrophoretic fluid when the package is opened, which can be unpleasant and of environmental concerns.

SUMMARY OF THE INVENTION

One aspect of the present invention is directed to an anti-counterfeit module comprising an electrophoretic display film, wherein the film
  i) comprises a microcup layer having partition walls, a microcup bottom layer and microcups which are filled with an electrophoretic fluid comprising charged pigment particles dispersed in a solvent, and the microcup layer is sandwiched between a first stack of layers and a second stack of layers; and
  ii) shows a contrast ratio of less than 3, after one or more strong barrier layers are removed to allow the solvent to evaporate.

In one embodiment, degradation of the contrast ratio occurs within 24 hours. In one embodiment, the solvent in the fluid is a hydrocarbon solvent. In another embodiment, the solvent is a fluorinated solvent. In one embodiment, the microcup layer is a weak barrier layer. In another embodiment, the microcup layer is a strong barrier layer.

Another aspect of the present invention is directed to a method for protection against counterfeit, which method comprises:
  a) providing an anti-counterfeiting module which comprises an electrophoretic display film, wherein
    i) the film comprises a microcup layer having partition walls, a microcup bottom layer and microcups which are filled with an electrophoretic fluid comprising charged pigment particles dispersed in a solvent, and the microcup layer is sandwiched between a first stack of layers and a second stack of layers;
    ii) the microcup layer is a weak barrier layer;
    iii) at least one of the layers in the first stack of layers is a strong barrier layer; and
    iv) at least one of the layers in the second stack of layers is a strong barrier layer, and
  b) removing one or more layers from the first stack of layers or removing one or more layers from the second stack of layers, or both, leaving behind only weak barrier layers in the stack to allow the solvent to evaporate from the display film.

In one embodiment, the first stack of layers comprises a sealing layer, an adhesive layer, a first electrode layer and optionally a first protective layer. In one embodiment, the second stack of layers comprises a primer layer, a second electrode layer, a substrate layer and optionally a second protective layer.

In one embodiment, the solvent in the fluid is a hydrocarbon solvent. In this case, a weak barrier layer has a polarity similar to that of the hydrocarbon solvent while a strong barrier layer has a polarity different from that of the hydrocarbon solvent. In one embodiment, a weak barrier layer is prepared from a hydrophobic material or includes a significant amount of hydrophobic functional groups or linkages, whereas a strong barrier layer is prepared from a hydrophilic material or includes a significantly amount of hydrophilic functional groups or linkages.

When the solvent is a hydrocarbon solvent, a strong barrier layer may be formed from a water soluble polymer and a weak barrier layer is formed from a material selected from the group consisting of polyurethanes, acrylate polymers and epoxy resins.

In one embodiment, the solvent in the fluid is a fluorinated solvent. In this case, a strong barrier layer may be formed from a material selected from the group consisting of non-fluorinated thermoplastic or thermoset precursors and a weak barrier layer is formed from a material selected from the group consisting of fluorinated polymers and precursors thereof.

In one embodiment, an electrode layer as a strong barrier layer is formed from a material selected from the group consisting of indium tin oxide, aluminum doped zinc oxide and indium doped cadmium oxide. An electrode layer as a weak barrier layer is formed from a material selected from the group consisting of poly(3,4-ethylenedioxythiophene) poly(styrenesulfonate) (PEDOT:PSS), carbon nanotube and silver nanowire.

A further aspect of the invention is directed to a method for protection against counterfeit, which method comprises:
  a) providing an anti-counterfeiting module which comprises an electrophoretic display film, wherein
    i) the film comprises a microcup layer having partition walls, a microcup bottom layer and microcups which are filled with an electrophoretic fluid comprising charged pigment particles dispersed in a solvent, and the microcup layer is sandwiched between a first stack of layers and a second stack of layers;
    ii) the microcup layer is a strong barrier layer;
    iii) the first stack of layers comprises at least one strong barrier layer and a sealing layer which is a weak barrier layer; and
    iv) at least one of the layers in the second stack of layers is a strong barrier layer, and
  b) removing layers in the first stack of layers, leaving behind the sealing layer and any layer next to the sealing layer which is also a weak barrier layer to allow the solvent to evaporate from the display film.

A yet further aspect of the present invention is directed to an anti-counterfeit module comprising an electrophoretic display film, wherein the film a) comprises a microcapsule layer having microcapsules wherein each of the microcapsule is filled with an electrophoretic fluid comprising charged pigment particles dispersed in a solvent, and the fluid is surrounded by a wall which is a weak barrier layer;
b) comprises one or more strong barrier layers on each side of the microcapsule layer; and
a) shows a contrast ratio of less than 3, after the strong barrier layers are removed to allow the solvent to evaporate.

BRIEF DESCRIPTION OF THE DRAWINGS

FIG. 1 depicts the cross-section view of an electrophoretic display film of the present invention.

DETAILED DESCRIPTION OF THE INVENTION

The present invention is directed to an electrophoretic display film which can be controlled to malfunction permanently within a period of time. It provides an elegant method to utilize an electrophoretic film for anti-counterfeit purposes. The concept involves the removal of strong barrier layer(s) from the film to allow the solvent in the electrophoretic fluid within the film to evaporate through weak barrier layer(s) and within a period of time, the performance of the display film will be significantly degraded and the film cannot be re-used. The term "significantly degraded" for the display film may be defined as contrast ratio of the film reached below 3 and this may take place within 24 hours.

Removal of a strong barrier layer may also be referred to as "dismantling or separation of the film" in sections below.

In the context of the present invention, the term "strong barrier layer" is defined as a layer in the electrophoretic display film that has a solvent permeation rate of <0.1 gram in an area of 1 m$^2$ with a specific thickness, within 24 hours under 1 atm at 25° C. and 50% RH, and the term "weak barrier layer" is defined as a layer that has a solvent permeation rate of >1 gram in an area of 1 m$^2$ with a specific thickness, within 24 hours under 1 atm at 25° C. and 50% RH. The solvent permeation rate is thickness dependent. For layers formed from the same material, the thicker the layer, the lower the permeation rate.

To test the solvent permeation rate of a single layer or a stack of layers, a standard permeation rate testing method, ASTM F739, can be used. For an integrated electrophoretic display, the weight loss can be tracked to estimate the permeation rate.

FIG. 1 illustrates a general structure for an electrophoretic display film (10) of the present invention. It comprises a plurality of microcups (11) filled with an electrophoretic fluid (12) which comprises charged pigment particles dispersed in a solvent or solvent mixture. The microcup layer has wall area (11a) and bottom area (11b) and the microcups are sandwiched between two stacks of layers which may include electrode layers (15 and 18). There are a sealing layer (13) and an optional adhesive layer (17) which is between the top electrode layer (18) and the sealing layer. The bottom electrode layer (15) usually is laminated to a substrate layer (16). There may also be a dielectric layer (14) between the bottom electrode layer (15) and the microcup layer.

Optionally, there may be a front protective layer (19) and/or a bottom protective layer (20). The function of the protective layer is to provide mechanical and environmental protection from, for example, UV irradiation, high or low humidity, surface scratch and impact. A front protection layer can also provide optical effect to the display, for example, adding anti-glare function on the surface or tuning the color temperature of the display. Optionally, pressure sensitive adhesives (not shown) are used to incorporate the protective layers onto the display.

The dielectric layer (14) may be a primer layer. The primer layer is often precoated onto the electrode layer to regulate the adhesion between the microcups and the electrode layer.

For brevity, layers (13), (17), (18) and (19) may be referred to as a first stack of layers and layers (14), (15), (16) and (20) may be referred to as a second stack of layers.

Such a display film may be prepared by the processes as described in U.S. Pat. No. 6,930,818, the content of which is incorporated herein by reference in its entirety. According to the patent, microcups may be formed by either a batchwise process or a continuous roll-to-roll process. A composition for forming the microcups is first coated on an electrode layer, followed by a microembossing or photolithographic method. A preferred process is microembossing by applying a male mold over the microcup composition to form microcups. The male mold may be released during or after the microcup composition is hardened. The microcups are then filled with a display fluid, followed by forming a sealing layer to enclose the fluid within the microcups.

The desired thickness of any of the layers referred to above would depend on the function of the layer. The thickness is a parameter, in addition to the material selection, which may be used to tune the barrier property of a layer.

In FIG. 1, the microcup bottom (11b) may have a thickness in the range of 0.05 um to 20 um. The thickness of the primer layer (14) may be in the range of 0.05 um-20 um. The thickness of the sealing layer (13) is usually in the range of 2 um-40 um. The thickness of the adhesive layer (17) may be in the range of 1 um-40 um. The thickness of the substrate layer (e.g., 16) may be in the range of 4 um-400 um. The thickness of the protective layer (19 or 20) may be in the range of 10 um-400 um. The thickness of the pressure sensitive adhesive is usually in the range of 6 um-200 um.

The barrier property (strong or weak) of any of the layers referred to would depend on their locations and where the separation of the film takes place.

The microcup wall (11a) and the microcup bottom (11b) are usually weak barrier layers. In this case, at least one of the layers (13), (17), (18) and (19) has to be a strong barrier layer and at least one of the layers (14), (15), (16) and (20) also has to be a strong barrier layer, to prevent the solvent in the fluid to evaporate, during normal operation before separation of the film.

However, when such a film is incorporated into an anti-counterfeit module, the aim is to disable the film after one-time use, by dismantling the film. If separation of the film takes place between layers (11b) and (14), since layer (11b) is a weak barrier layer, the solvent in the fluid will evaporate through layers (11a) and (11b) to cause failure of the film. If separation takes place between layers (14) and (15), layer (14) has to be a weak barrier layer to allow the solvent to evaporate through layers (11a), (11b) and (14). If separation takes place between (15) and (16), both layers (14) and (15) have to be weak barrier layers to allow the solvent to evaporate through layers (11a), (11b), (14) and (15). Likewise, if separation takes place between layers (16) and (20), layers (14), (15) and (16) all have to be weak barrier layers.

Similarly, if the separation of the film takes place between (13) and (17), layer (13) has to be a weak barrier layer to allow the solvent to evaporate through layers (11a), (11b) and (13). If the separation takes place between (17) and (18), then both layers (13) and (17) have to be weak barrier layers to allow the solvent to evaporate through layers (11a), (11b), (13) and (17). If separation takes place between layers (18) and (19), layers (13), (17) and (18) have to be weak barrier layers.

It is also possible for the microcup partition wall (11a) and the microcup bottom layer (11b) to be strong barrier layers. In this case, the sealing layer (13) must be a weak barrier layer. The separation of film may then take place between layers (13) and (17) to allow the solvent to evaporate through layer (13). If the separation does not take place between layers (13) and (17), the remaining layer(s) must be next to the sealing layer (13) and also be weak barrier layers. For example, if separation takes place between layers (17) and (18), then both layers (13) and (17) have to be weak barrier layers.

Suitable compositions for forming the microcups as a weak barrier layer are disclosed previously. U.S. Pat. Nos. 6,831,770 and 6,930,818 describe that a suitable composition for forming microcups may comprise a thermoplastic, thermoset, or a precursor thereof. Examples of thermoplastic or thermoset precursor may be multifunctional acrylate or methacrylate, multifunctional vinylether, multifunctional epoxide and oligomers or polymers thereof. A crosslinkable oligomer imparting flexibility, such as urethane acrylate or polyester acrylate, may also be added to improve the flexure resistance of the microcups formed.

U.S. Pat. No. 7,880,958 describes composition for microcups which may comprise a polar oligomeric or polymeric material. Such a polar oligomeric or polymeric material may be selected from the group consisting of oligomers or polymers having at least one of the groups such as nitro ($-NO_2$), hydroxyl ($-OH$), carboxyl ($-COO$), alkoxy ($-OR$ wherein R is an alkyl group), halo (e.g., fluoro, chloro, bromo or iodo), cyano ($-CN$), sulfonate ($-SO_3$) and the like. The glass transition temperature of the polar polymer material is preferably below about 100° C. and more preferably below about 60° C. Specific examples of suitable polar oligomeric or polymeric materials may include, but are not limited to, polyhydroxy functionalized polyester acrylates (such as BDE 1025, Bomar Specialties Co, Winsted, Conn.) or alkoxylated acrylates, such as ethoxylated nonyl phenol acrylate (e.g., SR504, Sartomer Company), ethoxylated trimethylolpropane triacrylate (e.g., SR9035, Sartomer Company) or ethoxylated pentaerythritol tetraacrylate (e.g., SR494, from Sartomer Company).

U.S. patent application Ser. No. 13/686,778 discloses another type of composition for forming microcups. The composition of comprises (a) at least one difunctional UV curable component, (b) at least one photoinitiator, and (c) at least one mold release agent. Suitable difunctional components may have a molecular weight higher than about 200. Difunctional acrylates are preferred and difunctional acrylates having an urethane or ethoxylated backbone are particularly preferred. More specifically, suitable difunctional components may include, but are not limited to, diethylene glycol diacrylate (e.g., SR230 from Sartomer), triethylene glycol diacrylate (e.g., SR272 from Sartomer), tetraethylene glycol diacrylate (e.g., SR268 from Sartomer), polyethylene glycol diacrylate (e.g., SR295, SR344 or SR610 from Sartomer), polyethylene glycol dimethacrylate (e.g., SR603, SR644, SR252 or SR740 from Sartomer), ethoxylated bisphenol A diacrylate (e.g., CD9038, SR349, SR601 or SR602 from Sartomer), ethoxylated bisphenol A dimethacrylate (e.g., CD540, CD542, SR101, SR150, SR348, SR480 or SR541 from Sartomer), and urethane diacrylate (e.g., CN959, CN961, CN964, CN965, CN980 or CN981 from Sartomer; Ebecryl 230, Ebecryl 270, Ebecryl 8402, Ebecryl 8804, Ebecryl 8807 or Ebecryl 8808 from Cytec). Suitable photoinitiators may include, but are not limited to, bis-acyl-phosphine oxide, 2-benzyl-2-(dimethylamino)-1-[4-(4-morpholinyl) phenyl]-1-butanone, 2,4,6-trimethylbenzoyl diphenyl phosphine oxide, 2-isopropyl-9H-thioxanthen-9-one, 4-benzoyl-4'-methyldiphenylsulphide and 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propane-1-one, 2,2-dimethoxy-1,2-diphenylethan-1-one or 2-methyl-1[4-(methylthio)phenyl]-2-morpholinopropan-1-one. Suitable mold release agents may include, but are not limited to, organomodified silicone copolymers such as silicone acrylates (e.g., Ebercryl 1360 or Ebercyl 350 from Cytec), silicone polyethers (e.g., Silwet 7200, Silwet 7210, Silwet 7220, Silwet 7230, Silwet 7500, Silwet 7600 or Silwet 7607 from Momentive). The composition may further optionally comprise one or more of the following components, a co-initiator, monofunctional UV curable component, multifunctional UV curable component or stabilizer.

The contents of all of the patents and patent application referred to above are incorporated herein by reference in their entirety.

If a fluorinated solvent is used in the fluid, the material for the microcups preferably has fluorinated functional groups to render the microcup layer to be a weak barrier layer.

Suitable solvents used in the electrophoretic fluid may be non-polar solvents with a favorable boiling point and viscosity. A solvent of lower viscosity is preferred for display performance, such as switching speed. Preferred non-polar solvents are hydrocarbon solvents and fluorinated solvents. The fluorinated solvent preferably has more than 50% by weight of fluorine.

The solvents may include common alkane solvents, such as pentane, hexane, heptane, octane, nonane, decane, undecane, dodecane, tridecane, tetradecane, pentadecane, heptadecane, hexadecane, octadecane, nonadecane, isocane, isomers or mixtures thereof. Commercially available alkane solvents include, but are not limited to, Isopar from ExxonMobile Chemical, ShellSol from Shell, Soltrol from Chevron, Isane from Total. Commonly used fluorinated solvents may include fluorinated alkanes, fluoroethers, fluorinated amines or the like. Commercially available fluorinated solvent may include, but are not limited to, FC-43 from 3M, Galden fluid from Solvay.

A co-solvent may be optionally added to the fluid. Suitable co-solvents may include, but are not limited to, hydrogenated fluorinated solvent, halogenated alkanes or the like, such as halocarbon oil from Halocarbon Product Corporation.

The selection of the solvent for the fluid is important in determining the barrier properties of the layers in the display film. In other words, a layer may exhibit different barrier properties when different solvents are used in the fluid.

The material for forming the microcups (if a weak barrier layer) usually has a polarity similar to that of the solvent in the electrophoretic fluid, while a strong barrier layer has a polarity substantially different from that of the solvent.

For example, if a hydrocarbon solvent is used in the fluid, the microcups should be prepared from a hydrophobic material whereas a strong barrier layer should be prepared from a hydrophilic material. More specifically, a weak barrier layer has a polarity similar to that of an alkane solvent in the electrophoretic fluid while a strong barrier layer has a polarity substantially different from that of the alkane solvent. For example, if a hydrocarbon solvent is used in the fluid, the weak barrier layer should be prepared from a hydrophobic material or include a significant amount of hydrophobic functional groups or linkages, whereas a strong barrier layer should be prepared from a hydrophilic material or include a significantly amount of hydrophilic functional groups or linkages. A greater than 10% by weight is considered to be a significant amount. For a polymeric layer, a high crosslinking density and/or high glass transition temperature (Tg) may also help strengthen the barrier property.

In the case of a hydrocarbon solvent, the dielectric layer (14) or the substrate layer (16) as a strong barrier layer may be formed from a hydrophilic polymer, preferably a water-soluble polymer, such as polyvinyl alcohol, polyacrylamide, cellulose, gelatin, polyvinylpyrrolidone or the like.

If a hydrocarbon solvent is used in the fluid, suitable materials for forming the dielectric layer as a weak barrier layer may be polyurethanes, acrylate polymers, epoxy resins or the like.

To impart weak barrier properties, the concentration of hydrophilic polymers (preferably water-soluble) within the layer has to be controlled to be less than 70% by weight. At the same time, non-water soluble polymers, such as polyurethane or polyethylene vinyl acetate, may be added.

In the case of a fluorinated solvent in the display fluid, a weak barrier layer comprises more than 10% by weight of fluorine while a strong barrier can be hydrophobic or hydrophilic and the fluorine content is controlled to be within 10% by weight. The content of fluorine will determine the compatibility of a fluorinated solvent with a polymer matrix. The degree of compatibility controls the permeation rate. A fluorinated solvent is more compatible with, thus more permeable in, a polymer matrix of higher fluorine content, and the polymer matrix has less hydrophilic functional groups and linkages.

More specifically, for a fluorinated solvent, a strong barrier layer may be formed from non-fluorinated thermoplastic or thermoset precursors, such as thermoplastic polyurethane, polyacrylate, polyester, acrylic monomer and oligomers, glycidyl or vinyl ether or the like. To impart weak barrier property, fluorinated polymers or precursors thereof can be added into the composition. Suitable fluorinated polymers and precursors thereof may include, but are not limited to, fluorinated acrylate, such as 1H,1H,5H-octafluoropentyl acrylate, dodecafluoroheptyl acrylate, 1H,1H,2H,2H-perfluorodecyl acrylate, 3,3,4,4,5,5,6,6,7,7,8,8-tridecafluorooctyl methacrylate, 1H,1H,2H,2H-perfluorodecyl acrylate, 1,1,1-trifluoro-2-(trifluoromethyl)-2-hydroxy-4-methyl-5-pentyl methacrylate, pentafluorophenyl methacrylate or homopolymer or copolymer thereof, fluorinated polyurethane formed from di-isocyanate and/or polyisocyanate with fluorinated alcohols, such as perfluoroether diol and fluorinated alkyl diol.

When an electrode layer (e.g., 15 or 18) is a strong barrier layer, it may be formed from a material such as indium tin oxide, aluminum doped zinc oxide, indium doped cadmium oxide or the like.

When a hydrocarbon solvent is used, an electrode layer as a weak barrier layer may be formed from a conductive polymer, such as poly(3,4-ethylenedioxythiophene) poly(styrenesulfonate) (PEDOT:PSS).

Other materials for an electrode layer may include carbon nanotube, silver nanowire or the like. The barrier property of these materials would depend on their polymer matrix. In other words, their barrier property would depend on the solvent used in a display film.

The microcup layer should be strong enough to maintain intact when a barrier layer is removed. In this case, the solvent in the display fluid contained within the microcups can slowly evaporate through the weak barrier layers without having dramatic environmental impact.

While microcups are specifically mentioned in this application, it is understood that the concept of the present invention is also applicable to other types of electrophoretic displays. The microcups as display cells can be replaced with microcapsules, micro-channels or other types of micro-containers. The manufacture of the microcapsules as display cells for an electrophoretic display is described in various US patents and applications, such as U.S. Pat. No. 5,930,026. If the wall of the microcapsules is a weak barrier, in the final assembled film, one or more strong barriers can be used to prevent the solvent from evaporation. Once the strong barriers are peeled off, the solvent in the display fluid will evaporate, resulting in malfunction of the display.

As stated, the electrophoretic display film is suitable for anti-counterfeit applications, such as smart labels. For example, a film of the present invention may be part of a tamper-free module used to seal packaged goods. Before opening the package, a user can activate the film to display a special graphic pattern to authenticate the goods in the package. When the package is opened, the film is broken and a strong barrier layer in the film is removed to cause the solvent in the display film to evaporate. As a result, the film will no longer be operable and cannot be re-used.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

It is therefore wished that this invention to be defined by the scope of the appended claims as broadly as the prior art will permit, and in view of the specification.

What is claimed is:

1. A module comprising an electrophoretic display film, wherein the film
   a) comprises a microcup layer having (i) partition walls, (ii) a microcup bottom layer, and (iii) microcups filled with an electrophoretic fluid comprising charged pigment particles dispersed in a solvent, wherein the microcup layer is sandwiched between a first stack of layers and a second stack of layers, and each of the stack of layers comprises one or more strong barrier layers; and
   b) shows a contrast ratio of less than 3, after the one or more strong barrier layers are removed to allow the solvent to evaporate.

2. The module of claim 1, wherein degradation of the contrast ratio occurs within 24 hours.

3. The module of claim 1, wherein the solvent is a hydrocarbon solvent.

4. The module of claim 1, wherein the solvent is a fluorinated solvent.

5. The module of claim 1, wherein the microcup layer is a weak barrier layer.

6. The module of claim 1, wherein the microcup layer is a strong barrier layer.

7. A module comprising an electrophoretic display film, wherein the film
   a) comprises a microcapsule layer having microcapsules wherein each of the microcapsule is filled with an electrophoretic fluid comprising charged pigment particles dispersed in a solvent, and the fluid is surrounded by a wall which is a weak barrier layer;
   b) comprises one or more strong barrier layers on each side of the microcapsule layer; and c) shows a contrast ratio of less than 3, after the strong barrier layers are removed to allow the solvent to evaporate.

* * * * *